UNITED STATES PATENT OFFICE.

CHARLES A. BRUEDERLE, OF FOND DU LAC, WISCONSIN.

INSECTICIDE.

SPECIFICATION forming part of Letters Patent No. 527,234, dated October 9, 1894.

Application filed July 27, 1894. Serial No. 518,767. (No specimens.)

*To all whom it may concern:*

Be it known that I, CHARLES A. BRUEDERLE, a citizen of the United States, residing at Fond du Lac, in the county of Fond du Lac and State of Wisconsin, have invented a new and useful composition of matter to be used for the destruction of the Colorado beetle or potato-bug and like noxious insects that infest certain vegetation, of which the following is a specification.

My composition consists of the following ingredients, combined in the proportions stated, viz: oxide of iron, one hundred pounds; white arsenic, twenty-one pounds; muriate of potash, six and one-half pounds; sulphate of copper, four pounds; kainite, four and one-half pounds. These ingredients are to be pulverized and thoroughly mingled by agitation and stirring.

In using the above-named composition, it may be mixed, in water, in the proportion of say two tablespoonfuls of the compound to a pail of water, or with plaster in proportions to suit; and sown or sprinkled on the vines or plants infested with bugs, &c.

Some of the ingredients of this compound are of a poisonous character. Consequently it should not be used on edible plants or vegetable tops, but its use should be limited to vegetation, and tops of roots and vegetables, that neither man nor beast will eat, and only bug and insect pests devour.

This compound is much more economical and effective in its production and use than paris green, or other matter used for such purposes with which I am acquainted.

The particular advantage or improvement in my composition is twofold: first, the use of the smallest amount or proportion necessary for killing the bugs of the poisonous arsenic, with the largest proportion of ingredients innocuous to the plant, but on the contrary strengthening and fertilizing; and calculated thereby to resist, weaken, and in a measure neutralize the well known caustic and corrosive action of the arsenic on the plant; *e. g.*, oxide of iron, which comprises the bulk of the compound, is a fertilizer of the tuber or root; muriate of potash is a fertilizer and strengthener of the tops or leaves; so also in an important degree is kainite; second, the cheapness of the bulky part of the mixture allows of an economy in cost not attainable in other compositions of the like nature and purpose.

Paris green is, or has been heretofore, almost universally used, (in my part of the country at least.) It costs by the quantity twenty-five cents per pound, and goes little or no farther, pound for pound, than does my composition.

My compound can be made for less than two and one-quarter cents per pound, viz: one hundred pounds oxide of iron at three-fourths of a cent, seventy-five cents; twenty-one pounds white arsenic at four cents, eighty-four cents; six and one-half pounds muriate potash at nine cents, fifty-eight and one-half cents; four pounds sulphate copper at eleven cents, forty-four cents; four and one-half pounds kainite at nine cents, forty and one-half cents—one hundred and thirty-six total pounds; cost, three dollars and two cents. Divide the cost by the quantity, and we have 2.22+ cents per pound. I have arrived at these results by means of numerous experiments and tests, and close observations, as a practical gardener, and believe that my composition has no equal, for cheapness, effectiveness in its main purpose of the extermination of bugs, and the fertilization and strengthening of the plant in its power of resistance to the caustic, corroding elements of the bug destroying ingredients.

What I claim, and desire to secure by Letters Patent of the United States, is—

The herein-described composition of matter to be used for the destruction of potato bugs and like noxious insects, consisting of oxide of iron, white arsenic, muriate of potash, sulphate of copper and kainite, in the proportions specified.

CHAS. A. BRUEDERLE.

Witnesses:
F. F. DUFFY,
J. H. MCCRORY.